(12) United States Patent
Souda et al.

(10) Patent No.: US 9,033,847 B2
(45) Date of Patent: May 19, 2015

(54) AUTOMATIC TRANSMISSION

(75) Inventors: Toru Souda, Anjo (JP); Hiroshi Katou, Anjo (JP); Akitoshi Katou, Anjo (JP); Satoru Kasuya, Anjo (JP)

(73) Assignee: AISIN AW CO., LTD., Aichi (JP)

( * ) Notice: Subject to any disclaimer, the term of this patent is extended or adjusted under 35 U.S.C. 154(b) by 0 days.

(21) Appl. No.: 14/002,053

(22) PCT Filed: Mar. 9, 2012

(86) PCT No.: PCT/JP2012/056123
§ 371 (c)(1),
(2), (4) Date: Aug. 28, 2013

(87) PCT Pub. No.: WO2012/132839
PCT Pub. Date: Oct. 4, 2012

(65) Prior Publication Data
US 2013/0337964 A1    Dec. 19, 2013

(30) Foreign Application Priority Data

Mar. 28, 2011  (JP) .................. 2011-071025

(51) Int. Cl.
*F16H 3/66* (2006.01)
*F16H 3/44* (2006.01)

(52) U.S. Cl.
CPC ............. *F16H 3/44* (2013.01); *F16H 3/663* (2013.01); *F16H 2003/445* (2013.01); *F16H 2200/0052* (2013.01); *F16H 2200/2005* (2013.01); *F16H 2200/2025* (2013.01);
(Continued)

(58) Field of Classification Search
CPC ............. F16H 3/66; F16H 2200/052; F16H 2200/2007; F16H 2200/2043; F16H 2200/2079

USPC .................. 475/275–291, 313, 319, 325
See application file for complete search history.

(56) References Cited

U.S. PATENT DOCUMENTS

| 5,135,444 A | 8/1992 | Hattori |
| 5,525,117 A * | 6/1996 | Morisawa et al. ............ 475/281 |
| 5,951,433 A | 9/1999 | Tsukamoto et al. |

(Continued)

FOREIGN PATENT DOCUMENTS

| JP | 02-229946 A | 9/1990 |
| JP | 08-247230 A | 9/1996 |

(Continued)

OTHER PUBLICATIONS

International Search Report for PCT/JP2012/056123 dated May 15, 2012.

*Primary Examiner* — Roger Pang
(74) *Attorney, Agent, or Firm* — Sughrue Mion, PLLC (57) ABSTRACT

An automatic transmission ($1_1$) includes a planetary gear set (PS), first to third clutches (C-1 to C-3), first to third brakes (B-1 to B-3), and a counter gear (100) that outputs shifted rotation. The counter gear (100) is placed axially on one side of the planetary gear set (PS), and the second brake (B-2) is placed axially on the opposite side from of the counter gear (100) from the planetary gear set (PS). The second brake (B-2) that does not make higher speed rotation than other clutches and brakes can thus be separated from the planetary gear set (PS), and other clutches and brakes and the counter gear (100) are arranged near the planetary gear set (PS). Thus, members having a large thickness are reduced in length, whereby the automatic transmission is made compact and reduced in weight.

7 Claims, 4 Drawing Sheets

(52) U.S. Cl.
CPC .................. *F16H 2200/2046* (2013.01); *F16H 2200/2082* (2013.01); *F16H 2200/2066* (2013.01)

(56) References Cited

U.S. PATENT DOCUMENTS

| | | | |
|---|---|---|---|
| 6,468,179 B1 * | 10/2002 | Mathis et al. | 475/280 |
| 7,485,069 B2 * | 2/2009 | Jang et al. | 475/284 |
| 2005/0026739 A1 | 2/2005 | Ishimaru | |
| 2005/0090354 A1 * | 4/2005 | Armstrong et al. | 475/120 |
| 2006/0148610 A1 * | 7/2006 | Usoro et al. | 475/276 |

FOREIGN PATENT DOCUMENTS

| | | |
|---|---|---|
| JP | 10-169730 A | 6/1998 |
| JP | 2001-241519 A | 9/2001 |
| JP | 2005-042790 A | 2/2005 |

* cited by examiner

| | C-1 | C-2 | C-3 | B-1 | B-2 | B-3 | F-2 |
|---|---|---|---|---|---|---|---|
| 1ST | ○ | | | | | (○) | ○ |
| 2ND | ○ | | | | ○ | | |
| 3RD | ○ | | | ○ | | | |
| 4TH | ○ | ○ | | | | | |
| 5TH | | ○ | | ○ | | | |
| 6TH | | ○ | | | ○ | | |
| REV | | | ○ | | | ○ | |

(○): ENGINE BRAKE IN OPERATION

AUTOMATIC TRANSMISSION

INCORPORATION BY REFERENCE

This is a National Stage Entry of Application No. PCT/JP2012/056123 filed Mar. 9, 2013. The disclosure of Japanese Patent Application No. 2011-071025, filed on Mar. 28, 2011 including the specification, drawings and abstract is incorporated herein by reference in its entirety.

BACKGROUND OF THE INVENTION

The present invention relates to multi-stage automatic transmissions that are mounted on vehicles etc., and more particularly to arrangement structures of clutches capable of inputting rotation of an input shaft to each gear and a carrier of a planetary gear set and brakes capable of stopping rotation of each gear and the carrier.

DESCRIPTION OF THE RELATED ART

In recent years, improved fuel economy etc. has been desired and the number of shift speeds has been increased in automatic transmissions that are mounted on vehicles etc. Among such multi-stage automatic transmissions, automatic transmissions have been proposed which attain, e.g., six forward speeds and one reverse speed by using a planetary gear set having, e.g., two sun gears, two ring gears, and a carrier, namely five rotating elements, and using, e.g., three clutches and three brakes (see, e.g., FIGS. 1 to 3 of Japanese Patent Application Publication No. H02-229946 (JP H02-229946 A) and FIGS. 6 to 8 of Japanese Patent Application Publication No. 2001-241519 (JP 2001-241519 A))

SUMMARY OF THE INVENTION

With such a planetary gear set having five rotating elements as in JP H02-229946 A and JP 2001-241519 A, only one planetary gear set can be used to attain, e.g., six forward speeds and one reverse speed, without being combined with, e.g., any other planetary gear etc. Such a configuration is advantageous in terms of compactness. However, JP H02-229946 A and JP 2001-241519 A do not consider anything about making the automatic transmission compact and reducing the weight of the automatic transmission by the arrangement structure of the three clutches and the three brakes.

It is an object of the present invention to provide an automatic transmission that includes a planetary gear set having five rotating elements, three clutches, and three brakes to attain multi-stage shifting, and that can be made compact and can be reduced in weight.

According to a first aspect of the present invention, an automatic transmission includes: an input shaft that is inputted rotation from a driving source; a planetary gear set having a first sun gear, a second sun gear, a first ring gear, a second ring gear, and a carrier; a first clutch capable of inputting rotation of the input shaft to the first sun gear; a second clutch capable of inputting the rotation of the input shaft to the carrier; a third clutch capable of inputting the rotation of the input shaft to the second sun gear; a first brake capable of stopping rotation of the second sun gear; a second brake capable of stopping rotation of the first ring gear; a third brake capable of stopping rotation of the carrier; and an output member that outputs rotation of the second ring gear, wherein the output member is placed axially on one side of the planetary gear set, and the second brake is placed axially on an opposite side of the output member from the planetary gear set.

The output member is thus placed axially on the one side of the planetary gear set, and the second brake is thus placed axially on the opposite side of the output member from the planetary gear set. Accordingly, the second brake that does not have a higher rotational speed than other clutches and brakes (e.g., the first clutch, the third clutch, the first brake, and the third brake), namely the second brake that allows a coupling member, a hub member, etc. coupling the first ring gear to friction plates to have a relatively small thickness, can be placed at a position separated from the planetary gear set. This allows the output member and other clutches and brakes to be placed near the planetary gear set, and can reduce the length of a coupling member etc. coupling the output member and other clutches and brakes to the planetary gear set and having a relatively large thickness. Thus, the automatic transmission can be made compact and can be reduced in weight. Since the automatic transmission can be reduced in weight, inertia to be generated can be reduced, whereby controllability of the automatic transmission can also be improved.

Since the second brake is placed axially on the opposite side of the output member from the planetary gear set, the output member can be placed closer to the center in the axial direction. This is advantageous as an arrangement structure of a countershaft and a differential gear unit when used in, e.g., an FF-type automatic transmission (the axial direction is transverse to a vehicle traveling direction).

According to a second aspect of the present invention, the second clutch may be placed axially on one side of the output member, and be placed radially inward of the second brake.

The second clutch is thus placed axially on the one side of the output member and is placed radially inward of the second brake. Accordingly, the second clutch that does not have a higher rotational speed than other clutches and brakes (e.g., the first clutch, the third clutch, the first brake, and the third brake), namely the second clutch that allows a coupling member, a hub member, etc. coupling the carrier to friction plates to have a relatively small thickness can be placed at a position separated from the planetary gear set. This allows the output member and other clutches and brakes to be placed near the planetary gear set, and can reduce the length of a coupling member etc. coupling the output member and other clutches and brakes to the planetary gear set and having a relatively large thickness. Thus, the automatic transmission can be made compact and can be reduced in weight.

Moreover, since the second clutch is engaged at a relatively high shift speed as compared to other clutches and brakes (e.g., the first clutch, the third clutch, the first brake, and the third brake), the second clutch does not have a large transfer torque capacity, and a friction engagement portion of the friction plates can have a small area, whereby the diameter of the friction plates can be reduced. Since the second clutch having the friction plates with the reduced diameter is placed radially inward of the second brake, the automatic transmission can be made compact in the axial direction as compared to the case where, e.g., the friction plates of the second clutch are placed next to the friction plates of the second brake in the axial direction.

According to a third aspect of the present invention, friction plates of the third brake may be placed radially outward of the planetary gear set.

The friction plates of the third brake are thus placed radially outward of the planetary gear set. Accordingly, the third brake that is engaged at a first forward speed and a reverse speed and thus has a large transfer torque capacity, namely the third brake that causes a coupling member, a hub member, etc. coupling the carrier to the friction plates to have a relatively large thickness, can be placed near the planetary gear set. This can reduce the length of the coupling member etc. coupling the friction plates of the third brake to the planetary gear set and having a relatively large thickness, whereby the automatic transmission can be made compact and can be reduced in weight. Moreover, the friction plates of the third brake that tends to have a larger number of friction plates due to its large torque capacity can be made to overlap the planetary gear set in the axial direction (as viewed in the radial direction). This can reduce the length of the automatic transmission in the axial direction.

According to a fourth aspect of the present invention, the automatic transmission may further include: a support wall that is extended inward from an inner peripheral surface of a case so as to have a shape of a hollow circular plate, and that rotatably supports the output member, wherein a hydraulic oil chamber of a hydraulic servo of the third brake is formed on a side surface of the support wall.

Since the hydraulic oil chamber of the hydraulic servo of the third brake is thus formed on the side surface of the support wall of the case, an oil passage structure does not become complicated, and a hydraulic oil pressure can be supplied to the hydraulic oil chamber of the hydraulic servo of the third brake through an oil passage formed in the case and having a simple structure.

According to a fifth aspect of the present invention, the automatic transmission may further include: a one-way clutch that restricts rotation of the carrier in one direction, wherein the one-way clutch is placed radially outward of the planetary gear set.

The one-way clutch that restricts rotation of the carrier in the one direction is thus placed radially outward of the planetary gear set. Accordingly, the one-way clutch that is engaged at the first forward speed and thus has a large transfer torque capacity, namely the one-way clutch that causes a coupling member etc. coupling the carrier to an inner race to have a relatively large thickness, can be placed near the planetary gear set. This can reduce the length of the coupling member etc. coupling the one-way clutch to the planetary gear set and having a relatively large thickness, whereby the automatic transmission can be made compact and can be reduced in weight. Moreover, the one-way clutch that tends to be long in the axial direction due to its large torque capacity can be made to overlap the planetary gear set in the axial direction (as viewed in the radial direction). This can reduce the length of the automatic transmission in the axial direction.

According to a sixth aspect of the present invention, the carrier may rotatably support a first pinion that meshes with the first sun gear and the first ring gear, and a third pinion that meshes with a second pinion coupled to the first pinion and meshes with the second sun gear and the second ring gear.

The carrier is thus structured to rotatably support the first pinion that meshes with the first sun gear and the first ring gear, and the third pinion that meshes with the second pinion coupled to the first pinion and meshes with the second sun gear and the second ring gear. Accordingly, the planetary gear set can be configured which is capable of obtaining the six forward speeds as satisfactory step ratios.

According to a seventh aspect of the present invention, a first forward speed may be attained by engaging the first clutch and engaging the third brake, a second forward speed is attained by engaging the first clutch and engaging the second brake, a third forward speed is attained by engaging the first clutch and engaging the first brake, a fourth forward speed is attained by engaging the first clutch and the second clutch, a fifth forward speed is attained by engaging the second clutch and engaging the first brake, a sixth forward speed is attained by engaging the second clutch and engaging the second brake), and a reverse speed is attained by engaging the third clutch and engaging the third brake.

The six forward speeds and the reverse speed can thus be attained by operation of the first to third clutches and the first to third brakes.

DETAILED DESCRIPTION OF THE EMBODIMENTS

First Embodiment

Figure 1:
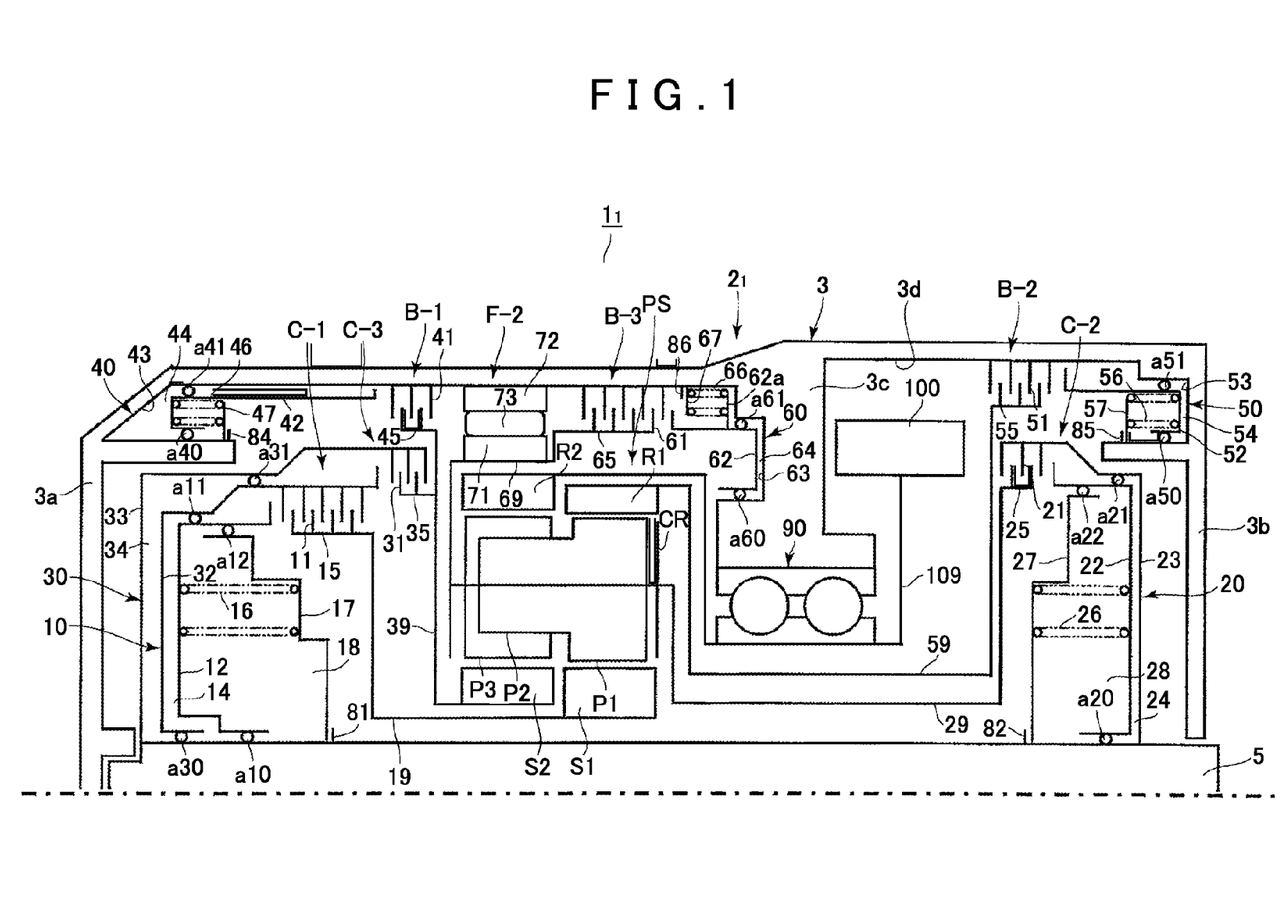
FIG. 1 is a schematic sectional view showing an automatic transmission according to a first embodiment.

A first embodiment according to the present invention will be described below based on FIGS. 1 to 3. As shown in FIG. 1, an automatic transmission $1_1$ that is preferably mounted on, e.g., front-drive, front-engine (FF) type vehicles has a transmission case (case) 3 to which a housing case containing a torque converter, not shown, etc. is connected. A speed change mechanism $2_1$, a countershaft, not shown, and a differential gear unit, not shown, are placed in the transmission case 3. The speed change mechanism $2_1$ is placed on, e.g., an axis about an input shaft 5 coaxial with an output shaft of an engine (not shown), the countershaft, not shown, is placed on an axis parallel to the input shaft 5, and the differential gear unit, not shown, is placed so as to have right and left axles on an axis parallel to the countershaft. The input shaft 5, the countershaft, and the right and left axles are positioned in a V shape as viewed from the side. The countershaft and the differential gear unit are generally arranged so as to adjoin the torque converter. Namely, the countershaft and the differential gear unit are arranged so as to overlap the input side of the input shaft 5 in the axial direction.

In the automatic transmission that is described below and is preferably mounted on an FF type vehicle, the lateral direction in the figures is actually the lateral direction in the vehicle. Depending on the direction in which the automatic transmission is mounted, the right side in the figures may actually be the left side of the vehicle, and the left side in the figures may actually be the right side of the vehicle. In the following description, however, the term "right side" or the "left side" refers to the "right side" or the "left side" in the figures unless otherwise specified.

A general arrangement structure of each portion of the speed change mechanism $2_1$ of the automatic transmission $1_1$ will be described based on FIG. 1. The speed change mechanism $2_1$ of the automatic transmission $1_1$ is provided with the input shaft 5 that is connected to the engine (driving source) via the torque converter, not shown, etc., and that is inputted rotation from the engine. The input shaft 5 has its both ends rotatably supported by the transmission case 3 via bearings, not shown. A planetary gear set PS is placed on the input shaft 5 so as to be arranged about the input shaft 5. A support wall 3c, which is extended inward from an inner peripheral surface 3d of the transmission case 3 and is formed in the shape of a hollow circular plate, is placed on the right side (one side in the axial direction) of the planetary gear set PS.

A bearing 90 is placed radially inward of the support wall 3c. A counter gear (output member) 100 placed on the right side (one side in the axial direction) of the support wall 3c is rotatably supported by the bearing 90 via a coupling member 109 coupled to a second ring gear R2 described in detail below. A second brake B-2 having friction plates 51 and a hydraulic servo 50 pressing and driving the friction plates 51, and a second clutch C-2 having friction plates 21 and a hydraulic servo 20 pressing and driving the friction plates 21 are arranged on the right side (one side in the axial direction) of the counter gear 100, specifically between the counter gear 100 and a partition wall 3b on the input side of the transmission case 3 (e.g., a wall formed by an oil pump cover etc.) such that the second brake B-2 is located on the outer peripheral side and the second clutch C-2 is located radially inward of the second brake B-2. That is, the second brake B-2 and the second clutch C-2 are arranged axially on the opposite side of the counter gear 100 from the planetary gear set PS.

Friction plates 61 of a third brake B-3 and a one-way clutch F-2 are arranged radially outward of the planetary gear set PS, specifically between the planetary gear set PS and the inner peripheral surface 3d of the transmission case 3. A hydraulic servo 60 pressing and driving the friction plates 61 of the third brake B-3 is placed so as to extend from the support wall 3c to the outer peripheral side of the planetary gear set PS such that a hydraulic oil chamber 64 is formed on the side surface of the support wall 3c.

A first brake B-1 having friction plates 41 and a hydraulic servo 40 pressing and driving the friction plates 41, a third clutch C-3 having friction plates 31 and a hydraulic servo 30 pressing and driving the friction plates 31, and a first clutch C-1 having friction plates 11 and a hydraulic servo 10 pressing and driving the friction plates 11 are arranged on the left side (the other side in the axial direction) of the planetary gear set PS, specifically between the planetary gear set PS and an end wall 3a on the opposite side from the input side of the transmission case 3 such that the first brake B-1 is located on the outer peripheral side, the third clutch C-3 is located on the inner peripheral side of the first brake B-1, and the first clutch C-1 is located on the inner peripheral side of the third clutch C-3.

Each part of the speed change mechanism $2_1$ will be described in detail below. The first clutch C-1 placed on the input shaft 5 includes the friction plates 11 and the hydraulic servo 10 that connects and disconnects the friction plates 11. The hydraulic servo 10 is of a so-called double piston type using a piston member 32 of the hydraulic servo 30 of the third clutch C-3 described below as a cylinder, and includes a piston member 12, a return spring 16 that presses the piston member 12 and the piston member 32 described below back to the left side, and a cancel plate 17 that receives a reaction force of the return spring 16. The piston member 12 is placed so as to be movable in the axial direction (lateral direction) with respect to the input shaft 5 and the piston member 32, and forms a hydraulic oil chamber 14 between the piston member 12 and the input shaft 5 and the piston member 32 by two seal rings a10, a11. The cancel plate 17 is positioned and fixed with respect to the input shaft 5 in the axial direction by a snap ring 81. The return spring 16 is provided in a compressed manner between the piston member 12 and the cancel plate 17, and a cancel oil chamber 18 that cancels a centrifugal oil pressure is formed between the piston member 12 and the cancel plate 17 by a seal ring a12.

Outer friction plates of the friction plates 11 of the first clutch C-1 are spline-engaged with the inner peripheral side of the tip end of the piston member 32, the piston member 32 is spline-engaged with a clutch drum 33 described below, and the clutch drum 33 is coupled to the input shaft 5. Thus, the outer friction plates of the friction plates 11 of the first clutch C-1 are rotationally coupled to the input shaft 5. Inner friction plates of the friction plates 11 of the first clutch C-1 are spline-engaged with the outer peripheral side of a hub member 15, the hub member 15 is coupled to a coupling member 19, and the coupling member 19 is coupled to a first sun gear S1 described below.

The third clutch C-3 placed on the input shaft 5 is placed so as to cover the outer peripheral side of the first clutch C-1, and includes the friction plates 31 and the hydraulic servo 30 that connects and disconnects the friction plates 31. The hydraulic servo 30 is of a so-called double piston type that contains the hydraulic servo 10 of the first clutch C-1 as described above, and has the clutch drum 33 and the piston member 32. The inner peripheral side of the clutch drum 33 is coupled to and fixed and attached to the left side end of the input shaft 5. That is, the inner peripheral side of the clutch drum 33 is rotationally coupled to the input shaft 5. The piston member 32 is placed so as to be movable in the axial direction (lateral direction) with respect to the input shaft 5 and the clutch drum 33, and forms a hydraulic oil chamber 34 between the piston member 32 and the input shaft 5 and the clutch drum 33 by two seal rings a30, a31.

Outer friction plates of the friction plates 31 of the third clutch C-3 are spline-engaged with the inner peripheral side of the tip end of the clutch drum 33. That is, the outer friction plates are rotationally coupled to the input shaft 5. Inner friction plates of the friction plates 31 of the third clutch C-3 are spline-engaged with the outer peripheral side of a hub member 35, the hub member 35 is coupled to a coupling member 39, and the coupling member 39 is coupled to a second sun gear S2 described below.

The first brake B-1 placed so as to cover the outer peripheral side of the third clutch C-3 is placed along the inner peripheral surface 3d of the transmission case 3, and includes the friction plates 41 and the hydraulic servo 40 that connects and disconnects the friction plates 41. The hydraulic servo 40 has a cylinder portion 43 formed on the inner surface of the end wall 3a of the transmission case 3, a piston member 42, a return spring 46 that presses the piston member 42 back to the left side, and a return plate 47 that receives a reaction force of the return spring 46. The piston member 42 is placed so as to be movable in the axial direction (lateral direction) with respect to the transmission case 3, and forms a hydraulic oil chamber 44 between the piston member 42 and the transmission case 3 by two seal rings a40, a41. The return plate 47 is positioned and fixed with respect to the transmission case 3 in the axial direction by a snap ring 84. The return spring 46 is provided in a compressed manner between the piston member 42 and the return plate 47.

Outer friction plates of the friction plates 41 of the first brake B-1 are spline-engaged with the inner peripheral surface 3d of the transmission case 3. That is, the outer friction plates are placed in a relatively non-rotatable manner. Inner friction plates of the friction plates 41 of the first brake B-1 are spline-engaged with the outer peripheral side of a hub member 45, the hub member 45 is coupled to the coupling member 39, and the coupling member 39 is coupled to the second sun gear S2 described below.

The third brake B-3 placed so as to extend from the outer peripheral side of the planetary gear set PS to the side surface of the support wall 3c is placed along the inner peripheral surface 3d of the transmission case 3, and includes the friction plates 61 placed radially outward of a first ring gear R1 described below, and the hydraulic servo 60 that connects and disconnects the friction plates 61. The hydraulic servo 60 has a cylinder portion 63 formed on the side surface of the support wall 3c of the transmission case 3, a piston member 62, a return spring 66 that presses the piston member 62 back to the right side, and a return plate 67 that receives a reaction force of the return spring 66. The piston member 62 is placed so as to be movable in the axial direction (lateral direction) with respect to the support wall 3c of the transmission case 3, and forms the hydraulic oil chamber 64 between the piston member 62 and the side surface of the support wall 3c of the transmission case 3 by two seal rings a60, a61. A support plate 62a is fixed and attached to the outer peripheral side of the piston member 62, and the return plate 67 is positioned and fixed with respect to the transmission case 3 in the axial direction by a snap ring 86. The return spring 66 is provided in a compressed manner between the support plate 62a and the return plate 67.

Outer friction plates of the friction plates 61 of the third brake B-3 are spline-engaged with the inner peripheral surface 3d of the transmission case 3. That is, the outer friction plates are placed in a relatively non-rotatable manner. Inner friction plates of the friction plates 61 of the third brake B-3 are spline-engaged with the outer peripheral side of a hub member 65, the hub member 65 is coupled to a carrier CR described below, and the coupling member 39 extends radially inward of an inner race 71 of the one-way clutch F-2 described below.

The one-way clutch F-2 placed radially outward of the planetary gear set PS and radially outward of the second ring gear R2 described below includes the inner race 71, an outer race 72, and a roller mechanism 73 placed between these races. The outer race 72 is spline-engaged with the inner peripheral surface 3d of the transmission case 3 and placed in a relatively non-rotatable manner. The inner race 71 is placed so as to be spline-engaged with the outer peripheral side of a coupling member 69, and is rotationally coupled to the hub member 65 and the carrier CR. The roller mechanism 73 is configured to restrict rotation of the inner lace 71 with respect to the outer race 72 to one direction. That is, the one-way clutch F-2 restricts reverse rotation of the carrier CR. In the present embodiment, the inner race 71 is configured to be spline-engaged with the outer peripheral side of the coupling member 69 that couples the hub member 65 and the carrier CR. However, the inner race 71 itself may be a member that couples the hub member 65 and the carrier CR. The present invention is not limited to the one-way clutch F-2 using the roller mechanism 73, and the one-way clutch F-2 may use a sprag mechanism as long as a similar function can be performed.

The second brake B-2 placed so as to cover the outer peripheral side of the second clutch C-2 is placed along the inner peripheral surface 3d of the transmission case 3, and includes the friction plates 51 and the hydraulic servo 50 that connects and disconnects the friction plates 51. The hydraulic servo 50 has a cylinder portion 53 formed on the inner surface of the partition wall 3b of the transmission case 3, a piston member 52, a return spring 56 that presses the piston member 52 back to the left side, and a return plate 57 that receives a reaction force of the return spring 56. The piston member 52 is placed so as to be movable in the axial direction (lateral direction) with respect to the transmission case 3, and forms a hydraulic oil chamber 54 between the piston member 52 and the transmission case 3 by two seal rings a50, a51. The return plate 57 is positioned and fixed with respect to the transmission case 3 in the axial direction by a snap ring 85. The return spring 56 is provided in a compressed manner between the piston member 52 and the return plate 57.

Outer friction plates of the friction plates 51 of the second brake B-2 are spline-engaged with the inner peripheral surface 3d of the transmission case 3. That is, the outer friction plates are placed in a relatively non-rotatable manner. Inner friction plates of the friction plates 51 of the second brake B-2 are spline-engaged with the outer peripheral side of a hub member 55, the hub member 55 is coupled to a coupling member 59, and the coupling member 59 extends radially inward of the counter gear 100 described below, and is coupled to the first ring gear R1 described below.

The second clutch C-2 placed radially inward of the second brake B-2 and on the input shaft 5 includes the friction plates 21 and the hydraulic servo 20 that connects and disconnects the friction plates 21. The hydraulic servo 20 has a clutch drum 23 coupled to the right side end of the input shaft 5, a piston member 22, a return spring 26 that presses the piston member 22 back to the right side, and a cancel plate 27 that receives a reaction force of the return spring 26. The piston member 22 is placed so as to be movable in the axial direction (lateral direction) with respect to the input shaft 5 and the clutch drum 23, and forms a hydraulic oil chamber 24 between the piston member 22 and the input shaft 5 and the clutch drum 23 by two seal rings a20, a21. The cancel plate 27 is positioned and fixed with respect to the input shaft 5 in the axial direction by a snap ring 82. The return spring 26 is provided in a compressed manner between the piston member 22 and the cancel plate 27, and a cancel oil chamber 28 that cancels a centrifugal oil pressure is formed between the piston member 22 and the cancel plate 27 by a seal ring a22.

Outer friction plates of the friction plates 21 of the second clutch C-2 are spline-engaged with the inner peripheral side of the tip end of the clutch drum 23. That is, the outer friction plates are rotationally coupled to the input shaft 5. Inner friction plates of the friction plates 21 of the second clutch C-2 are spline-engaged with the outer peripheral side of a hub member 25, the hub member 25 is coupled to a coupling member 29, and the coupling member 29 extends radially inward of the counter gear 100 described below (radially inward of the coupling member 59), and is coupled to the carrier CR described below.

The planetary gear set PS includes the first sun gear S1, the second sun gear S2, the carrier CR, the first ring gear R1, and the second ring gear R2. Of these elements, the sun gear S1 is rotatably supported with respect to the input shaft 5, and is coupled to the coupling member 19 as described above, so that the sun gear S1 is capable of receiving rotation of the input shaft 5 from the first clutch C-1. The second sun gear S2 is rotatably supported with respect to the input shaft 5 via the coupling member 19, and is coupled to the coupling member 39 as described above, so that the second sun gear S2 is capable of receiving rotation of the input shaft 5 from the third clutch C-3, and rotation of the second sun gear S2 can be stopped (the second sun gear S2 can be made stationary) by the first brake B-1.

Moreover, the carrier CR is coupled to the coupling member 29 as described above, so that the carrier CR is capable of receiving rotation of the input shaft 5 from the second clutch C-2. The carrier CR is coupled to the inner race 71 of the one-way clutch F-2 and the hub member 65, so that rotation of the carrier CR in one direction (reverse rotation) is restricted by the one-way clutch F-2, and rotation of the carrier CR can be stopped (the carrier CR can be made stationary) by the third brake B-3.

The carrier CR is configured to rotatably support a first pinion P1 that meshes with the first sun gear S1 and the first ring gear R1, and a third pinion P3 that meshes with a second pinion P2 coupled to the first pinion P1 and meshes with the second sun gear S2 and the second ring gear R2.

The first ring gear R1 is coupled to the coupling member 59 as described above, so that rotation of the first ring gear R1 can be stopped (the first ring gear R1 can be made stationary) by the second brake B-2. The second ring gear R2 is coupled to the coupling member 109, and the coupling member 109 is coupled to the counter gear 100. The coupling member 109 extends radially inward of the support wall 3c, and the coupling member 109 and the counter gear 100 are rotatably supported with respect to the support wall 3c via the bearing 90. A gear coupled to the countershaft, not shown, meshes with a part of the outer peripheral side of the counter gear 100, and the countershaft is coupled to driving wheels via a gear mechanism, not shown, the differential gear unit, etc.

Operation of the automatic transmission $1_1$ will be described below based on FIGS. 2 and 3 with reference to FIG. 1. For example, at a first forward speed (1st) in a drive (D) range, as shown in FIG. 2, the first clutch C-1 and the one-way clutch F-2 are engaged. Thus, as shown in FIGS. 1 and 3, the carrier CR is held stationary (rotation of the carrier CR is restricted), and rotation of the input shaft 5 (hereinafter referred to as the "input rotation") is input to the first sun gear S1. Accordingly, the input rotation of the first sun gear S1 is decelerated and output to the second ring gear R2 via the carrier CR held stationary, and the decelerated rotation as the first forward speed is output from the counter gear 100.

When engine brake is in operation (during coasting operation), the third brake B-3 is engaged to hold the carrier CR stationary to prevent normal rotation of the carrier CR, whereby the state the first forward speed is maintained. At the first forward speed, the one-way clutch F-2 prevents reverse rotation of the carrier CR and allows the carrier CR to make normal rotation. Thus, when, e.g., the shift range is switched from a non-driving range to a driving range, the first forward speed can be more smoothly attained by automatic engagement of the one-way clutch F-2.

Figure 2:
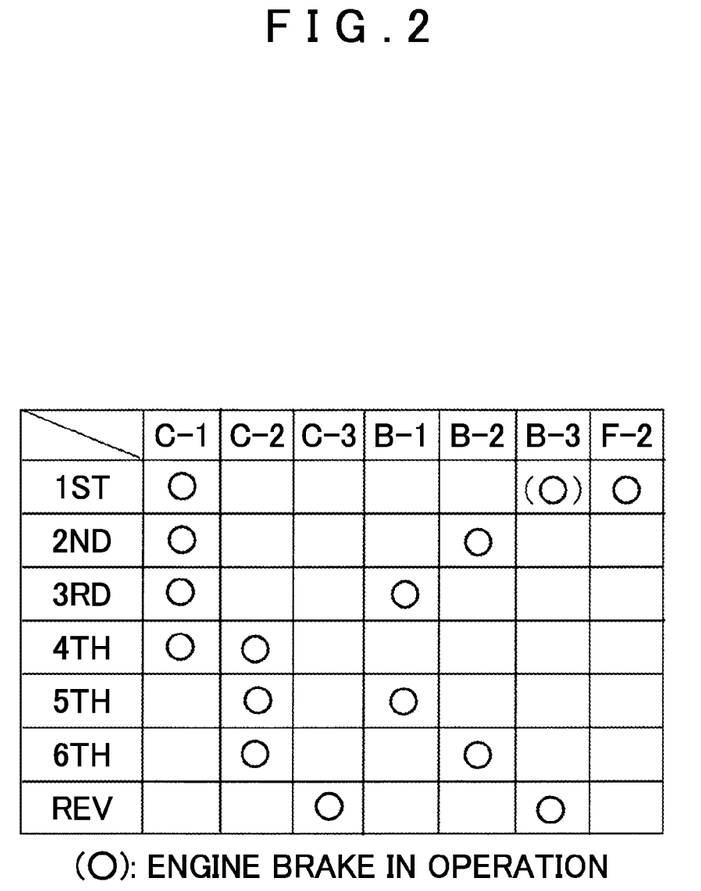
FIG. 2 is an engagement table of the automatic transmission.

At a second forward speed (2nd), as shown in FIG. 2, the first clutch C-1 is engaged, and the second brake B-2 is engaged. Thus, as shown in FIGS. 1 and 3, the first ring gear R1 is held stationary, and the input rotation is input to the first sun gear S1. Accordingly, the carrier CR makes decelerated rotation by the input rotation of the first sun gear S1 and the first ring gear R1 held stationary, the second ring gear R2 makes decelerated rotation by the carrier CR making decelerated rotation and the input rotation of the first sun gear S1, and the decelerated rotation as the second forward speed is output from the counter gear 100.

At a third forward speed (3rd), as shown in FIG. 2, the first clutch C-1 is engaged, and the first brake B-1 is engaged. Thus, as shown in FIGS. 1 and 3, the second sun gear S2 is held stationary, and the input rotation is input to the first sun gear S1. Accordingly, the carrier CR makes decelerated rotation, which is slightly faster than the second forward speed, by the input rotation of the first sun gear S1 and the second sun gear S2 held stationary, the second ring gear R2 makes decelerated rotation by the carrier CR making the decelerated rotation and the input rotation of the first sun gear S1, and the decelerated rotation as the third forward speed is output from the counter gear 100.

At a fourth forward speed (4th), as shown in FIG. 2, the first clutch C-1 and the second clutch C-2 are engaged. Thus, as shown in FIGS. 1 and 3, the input rotation is input to the first sun gear S1 by the engagement of the first clutch C-1, and the input rotation is input to the carrier CR by the engagement of the second clutch C-2. That is, since the input rotation is input to the first sun gear S1 and the carrier CR, the planetary gear set PS is brought into a directly coupled state of the input rotation, the input rotation is output as it is to the second ring gear R2, and the directly coupled rotation as the fourth forward speed is output from the counter gear 100.

At a fifth forward speed (5th), as shown in FIG. 2, the second clutch C-2 is engaged, and the first brake B-1 is engaged. Thus, as shown in FIGS. 1 and 3, the second sun gear S2 is held stationary, and the input rotation is input to the carrier CR. Accordingly, the second ring gear R2 makes accelerated rotation by the input rotation of the carrier CR and the second sun gear S2 held stationary, and the accelerated rotation as the fifth forward speed is output from the counter gear 100.

At a sixth forward speed (6th), as shown in FIG. 2, the second clutch C-2 is engaged, and the second brake B-2 is engaged. Thus, as shown in FIGS. 1 and 3, the first ring gear R1 is held stationary, and the input rotation is input to the carrier CR. Accordingly, the second ring gear R2 makes accelerated rotation, which is slightly faster than the sixth forward speed, by the input rotation of the carrier CR and the first ring gear R1 held stationary due to such a ratio of the number of teeth that the second pinion P2 having a smaller diameter than the first pinion P1 meshes with the third pinion P3 having a larger diameter. Thus, the accelerated rotation as the sixth forward speed is output from the counter gear 100.

At a reverse speed (Rev), as shown in FIG. 2, the third clutch C-3 is engaged, and the third brake B-3 is engaged. Thus, as shown in FIGS. 1 and 3, the carrier CR is held stationary, and the input rotation is input to the second sun gear S2. Accordingly, the input rotation of the second sun gear S2 is reversed by the carrier CR held stationary and is output to the second ring gear R2, and the decelerated reverse rotation as the reverse speed is output from the counter gear 100.

In, e.g., a parking (P) range and a neutral (N) range, the first clutch C-1, the second clutch C-2, and the third clutch C-3 are disengaged. Thus, the input shaft 5 is disconnected from the planetary gear set PS, and no power is transmitted from the input shaft 5 to the planetary gear set PS. Namely, power transmission between the input shaft 5 and the counter gear 100 is cut off.

In the automatic transmission $1_1$ described above, as shown in FIG. 3, the rotation of the first ring gear R1 and the carrier CR is the input rotation at the fourth forward speed, but is lower than the input rotation at the other forward speeds and the reverse speed. Accordingly, the coupling member 59 and the hub member 55 which couple the first ring gear R1 to the second brake B-2, and the coupling member 29 and the hub member 25 which couple the carrier CR to the second clutch C-2 do not make higher rotation than other coupling members 19, 39 and other hub members 15, 35 or the counter gear 100. Thus, the coupling members 29, 59 and the hub members 25, 55 do not need to withstand a high centrifugal force, and a structure having a thin thickness can be used for the coupling members 29, 59 and the hub members 25, 55.

Figure 3:
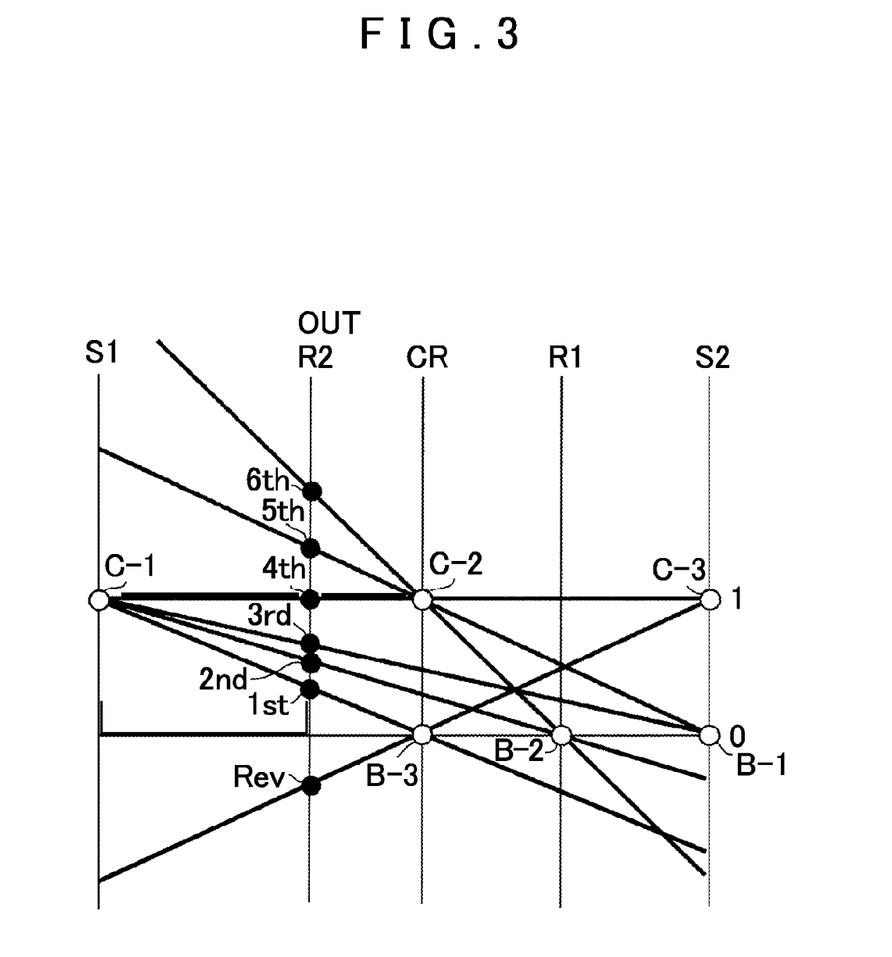
FIG. 3 is a speed diagram of the automatic transmission.

As shown in FIGS. 2 and 3, since the second clutch C-2 is engaged at relatively high shift speeds, namely the fourth to sixth forward speeds, the transfer torque capacity required for the second clutch C-2 is smaller than other clutches and brakes which are engaged at the first to third forward speeds and the reverse speed. Accordingly, the thickness of the coupling member 29 and the hub member 25 can further be reduced. Since the transfer torque capacity is small, a friction engagement portion (friction material) of the friction plates 21 can have a small area. Accordingly, the diameter of the friction plates 21 can be reduced, and the friction plates 21 need not be placed next to the friction plates 51 of the second brake B-2 in the axial direction, and can be arranged so as to be accommodated radially inward of the friction plates 51.

The second brake B-2 and the second clutch C-2 which do not make high speed rotation, or the second clutch C-2 having a small transfer torque capacity is thus placed at a position separated from the planetary gear set PS with the support wall 3c and the counter gear 100 interposed therebetween. Accordingly, the third brake B-3 that is engaged at the first forward speed and the reverse speed and thus has a large transfer torque capacity, the first clutch C-1, the third clutch C-3, and the first brake B-1 which make relatively high speed rotation, or the counter gear 100 that has large transfer torque at a low shift speed and that makes high speed rotation at a high shift speed can be placed near the planetary gear set PS. This can reduce the length of the coupling members 19, 39, 109, the hub members 15, 35, 65, etc. which have a relatively large thickness, whereby the automatic transmission $1_1$ can be made compact and can be reduced in weight. Since the automatic transmission $1_1$ can be reduced in weight, inertia to be generated can be reduced, whereby controllability of the automatic transmission $1_1$ can also be improved.

Since the second brake B-2 and the second clutch C-2 are arranged axially on the opposite side of the counter gear 100 from the planetary gear set PS, the counter gear 100 can be placed closer to the center in the axial direction. Accordingly, when used in, e.g., the FF-type automatic transmission $1_1$ (the axial direction is transverse to the vehicle traveling direction), the counter gear 10 does not interfere with the torque converter etc. This is advantageous as the arrangement structure of the countershaft and the differential gear unit.

More specifically, the friction plates 61 of the third brake B-3 that is engaged at the first forward speed and the reverse speed and thus has a large transfer torque capacity are arranged on the outer peripheral side of the planetary gear set PS. Accordingly, the coupling member (e.g., the inner race 71) and the hub member 65 which couple the carrier CR to the friction plates 61 have a relatively large thickness. However, since the coupling member and the hub member 65 are arranged near the planetary gear set PS, the coupling member and the hub member 65 can be reduced in length, whereby the automatic transmission $1_1$ can be made compact and can be reduced in weight. The friction plates 61 of the third brake B-3 that tends to have a larger number of friction plates due to its large torque capacity can be made to overlap the planetary gear set PS in the axial direction (as viewed in the radial direction). This can reduce the length of the automatic transmission in the axial direction.

The hydraulic oil chamber 64 of the hydraulic servo 60 of the third brake B-3 is formed on the side surface of the support wall 3c of the transmission case 3. Accordingly, the oil passage structure does not become complicated, and a configuration can be employed in which a hydraulic oil pressure is supplied to the hydraulic oil chamber 64 of the hydraulic servo 60 of the third brake B-3 through an oil passage formed in the transmission case 3 and having a simple structure.

Moreover, the one-way clutch F-2, which is engaged at the first forward speed and thus has a large transfer torque capacity, and which thus causes the inner race 71, and the coupling member 69 (including a side plate of the carrier CR) etc. coupling the carrier CR to the inner race 71 to have a relatively large thickness, can be placed on radially outward of the planetary gear set PS. This allows the one-way clutch F-2 to be placed as appropriate in the space radially outward of the planetary gear set PS, and can reduce the length of the coupling member 69 etc. having a relatively large thickness. Thus, the automatic transmission $1_1$ can be made compact and can be reduced in weight. Moreover, the one-way clutch F-2 that tends to be long in the axial direction due to its large torque capacity can be made to overlap the planetary gear set PS in the axial direction (as viewed in the radial direction). This can reduce the length of the automatic transmission in the axial direction.

The carrier CR is structured to rotatably support the first pinion P1 that meshes with the first sun gear S1 and the first ring gear R1, and the third pinion P3 that meshes with the second pinion P2 coupled to the first pinion P1 and meshes with the second sun gear S2 and the second ring gear R2. Accordingly, the planetary gear set PS can be configured which is capable of obtaining such first to sixth forward speeds as described above as satisfactory step ratios.

Second Embodiment

A second embodiment in which the first embodiment is partially modified will be described based on FIG. 4. In the second embodiment below, only those portions different from the automatic transmission $1_1$ of the first embodiment will be described. Since the second embodiment is otherwise substantially similar to the first embodiment, description thereof will be omitted.

Figure 4:
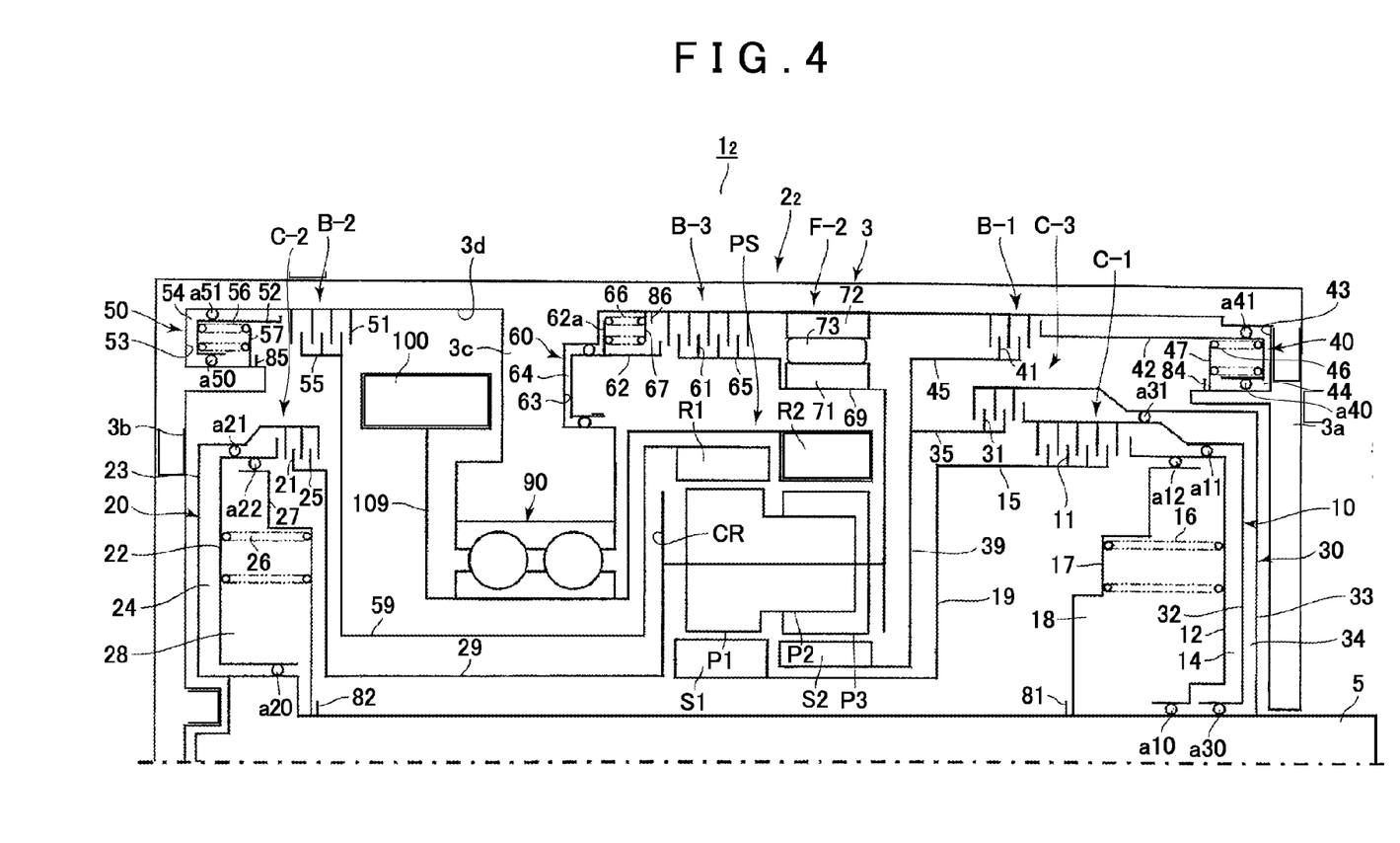
FIG. 4 is a schematic sectional view showing an automatic transmission according to a second embodiment.

As shown in FIG. 4, an automatic transmission $1_2$ that is preferably mounted on front-drive, front-engine (FF) type vehicles is configured so that the direction in which the engine (not shown) is connected to the input shaft 5 is the same as the automatic transmission $1_1$ of the first embodiment, and that the arrangement of the first to third clutches C-1 to C-3, the first to third brakes B-1 to B-3, the one-way clutch F-2, the planetary gear set PS, the counter gear 100, etc. is substantially inverted in the lateral direction (axial direction). Namely, a speed change mechanism $2_2$ is configured by substantially inverting the speed change mechanism $2_1$ in the lateral direction (axial direction).

Specifically, in the automatic transmission $1_2$, the speed change mechanism $2_2$ is placed on, e.g., an axis about the input shaft 5 coaxial with the output shaft of the engine (not shown), and the planetary gear set PS is placed on the input shaft 5 in the transmission case 3. The counter gear 100 is placed on the left side in the axial direction (one side in the axial direction) of the planetary gear set PS with the support wall 3c therebetween, the second brake B-2 is placed on the left side in the axial direction (one side in the axial direction) of the counter gear 100, and the second clutch C-2 is placed radially inward of the second brake B-2. That is, the second brake B-2 and the second clutch C-2 are placed on the opposite side in the axial direction of the counter gear 10 from the planetary gear set PS.

The third brake B-3 is placed so as to extend from the outer peripheral side of the planetary gear set PS to the support wall 3c such that the friction plates 61 of the third brake B-3 are located radially outward of the planetary gear set PS. The one-way clutch F-2 is placed on the right side in the axial direction (the other side in the axial direction) of the third brake B-3 such that the one-way clutch F-2 is located radially outward of the second ring gear R2. Moreover, the first brake B-1, the third clutch C-3, and the first clutch C-1 are arranged on the right side of the planetary gear set PS sequentially from the outer peripheral side to the inner peripheral side.

Since the automatic transmission $1_2$ having the above arrangement structure is the same as the automatic transmission $1_1$ of the first embodiment in terms of the coupling relation, operation at each shift speed, and effects, description thereof will be omitted.

Although the first and second embodiments are described above with respect to an example in which the automatic transmission is preferably used in FF type vehicles, the present invention is not limited to this.

It should be understood that the automatic transmissions described in the first and second embodiments can also be used in hybrid vehicles having an electric motor etc. mounted thereon, etc., in addition to, e.g., vehicles having only an engine mounted thereon as a driving source.

The automatic transmissions of the first and second embodiments are described with respect to an example in which a torque converter is placed between the automatic transmission and the engine. However, the present invention is not limited to this, and a starting device having a starting clutch, etc. may be used.

The first and second embodiments are described with respect to an example in which the automatic transmission includes the one-way clutch F-2 and can relatively smoothly attain the first forward speed. However, the automatic transmission may not include the one-way clutch F-2. In this case, the first forward speed can be attained by engaging the third brake B-3.

The automatic transmission according to the present invention can be used in vehicles such as passenger cars and trucks, and is preferably used particularly for such automatic transmissions that are desired to be made compact and to be reduced in weight.

What is claimed is:

1. An automatic transmission, comprising:
   an input shaft that is inputted rotation from a driving source;
   a planetary gear set having a first sun gear, a second sun gear, a first ring gear, a second ring gear, and a carrier;
   a first clutch capable of inputting rotation of the input shaft to the first sun gear;
   a second clutch capable of inputting the rotation of the input shaft to the carrier;
   a third clutch capable of inputting the rotation of the input shaft to the second sun gear;
   a first brake capable of stopping rotation of the second sun gear;
   a second brake capable of stopping rotation of the first ring gear;
   a third brake capable of stopping rotation of the carrier;
   an output member that outputs rotation of the second ring gear; and
   a coupling member that couples the first ring gear to the second brake, wherein
   the output member is placed axially on one side of the planetary gear set,
   the second brake is placed axially on an opposite side of the output member from the planetary gear set,
   the first ring gear is positioned closer to the output member than the second ring gear,
   the coupling member extends radially inward of the output member,
   the second clutch is placed axially on the opposite side of the output member and the first clutch, the third clutch and the first brake are placed a side of the planetary gear set opposite the output member.

2. The automatic transmission according to claim 1, wherein
   the second clutch is placed radially inward of the second brake.

3. The automatic transmission according to claim 2, wherein
   friction plates of the third brake are placed radially outward of the planetary gear set.

4. The automatic transmission according to claim 3, further comprising:
   a support wall that is extended inward from an inner peripheral surface of a case so as to have a shape of a hollow circular plate, and that rotatably supports the output member, wherein
   a hydraulic oil chamber of a hydraulic servo of the third brake is formed on a side surface of the support wall.

5. The automatic transmission according to claim 4, further comprising:
   a one-way clutch that restricts rotation of the carrier in one direction, wherein
   the one-way clutch is placed radially outward of the planetary gear set.

6. The automatic transmission according to claim 1, wherein
   the carrier rotatably supports a first pinion that meshes with the first sun gear and the first ring gear, and a third pinion that meshes with a second pinion coupled to the first pinion and meshes with the second sun gear and the second ring gear.

7. The automatic transmission according to claim 1, wherein
   a first forward speed is attained by engaging the first clutch and engaging the third brake,
   a second forward speed is attained by engaging the first clutch and engaging the second brake,
   a third forward speed is attained by engaging the first clutch and engaging the first brake,
   a fourth forward speed is attained by engaging the first clutch and the second clutch,
   a fifth forward speed is attained by engaging the second clutch and engaging the first brake,
   a sixth forward speed is attained by engaging the second clutch and engaging the second brake, and
   a reverse speed is attained by engaging the third clutch and engaging the third brake.

\* \* \* \* \*